(No Model.)
C. F. WILLIAMS.
RAILWAY SIGNAL.
No. 325,465. Patented Sept. 1, 1885.
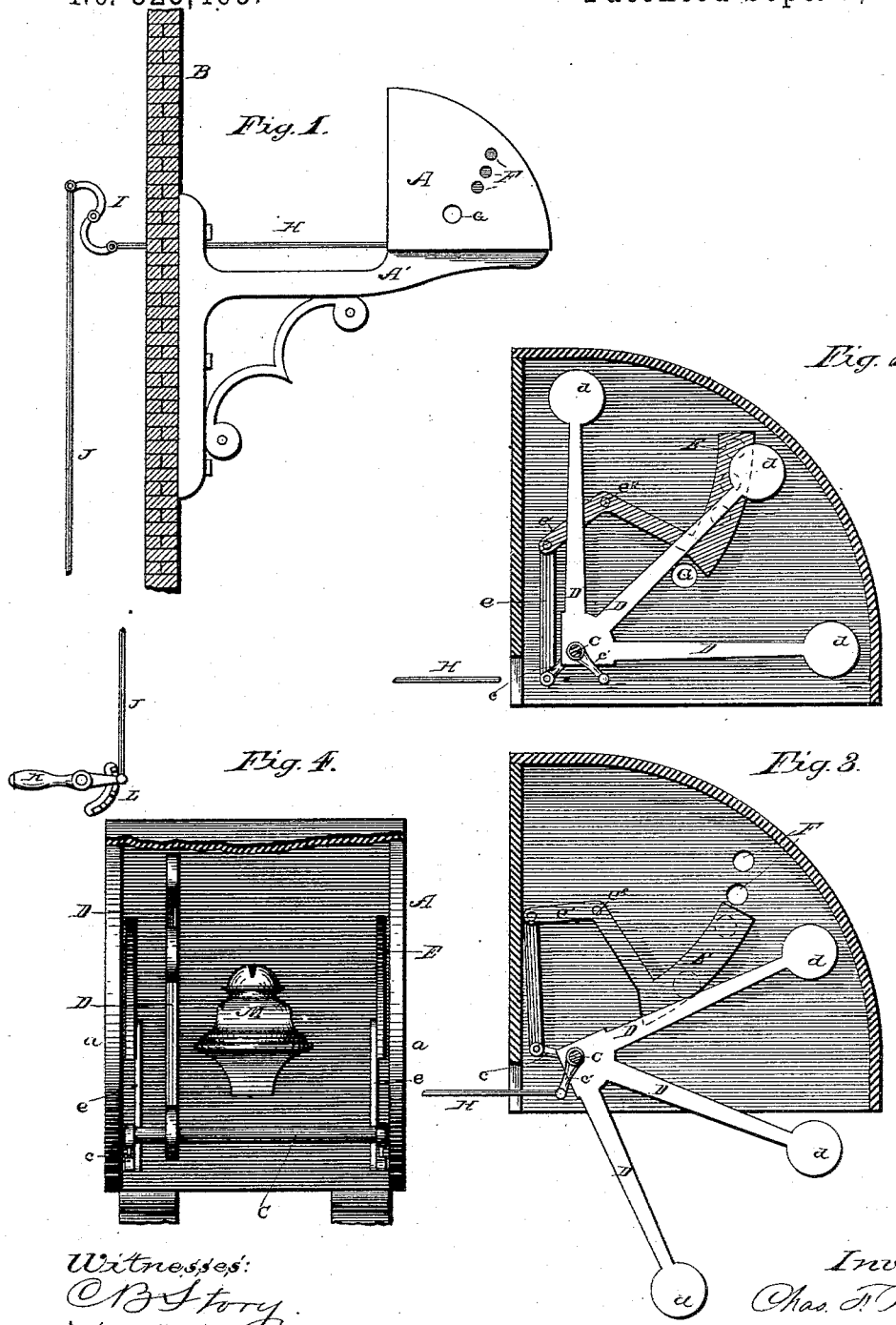

UNITED STATES PATENT OFFICE.

CHARLES F. WILLIAMS, OF CRISMAN, INDIANA.

RAILWAY-SIGNAL.

SPECIFICATION forming part of Letters Patent No. 325,465, dated September 1, 1885.

Application filed December 1, 1884. (No model.)

*To all whom it may concern:*

Be it known that I, CHARLES F. WILLIAMS, of Crisman, in the county of Porter and State of Indiana, have invented certain new and useful Improvements in Railway-Signals, of which the following is a description, reference being had to the accompanying drawings, in which—

Figure 1 is a side view of my improved railway-signal, showing the same connected with a station-house, so as to be operated therefrom. Fig. 2 is a vertical longitudinal sectional view showing the relative position of the parts when the track is clear. Fig. 3 is a like view showing two of said signals in use; and Fig. 4 is an end view of the signal-box, with a portion of the cover broken away to show the interior.

Like letters of reference indicate like parts in the different figures.

The object of my invention is to provide a railway-signal by which the delay and inconvenience heretofore so common resulting from the practice of stopping all trains for orders may be avoided.

A further object is to enable the telegraph-operator at a given station to operate said signal from his office and without leaving his position, all of which will be hereinafter more fully described, and definitely pointed out in the claims.

In the drawings, A represents a signal-box, which may be supported upon a suitable bracket, A', attached, as shown, to the wall B, Fig. 1, of a station-house; or said box may be placed upon a post at any desirable distance from the station, if necessary, in order to bring the same near and in proper relation to the main track.

Extending horizontally across and within the box A, I place a shaft, C, Figs. 2, 3, and 4, the ends of said shaft being secured in loose bearings in the sides $a\,a$, Fig. 4, of said case or box. Rigidly secured to said shaft C, and extending radially therefrom, as shown, are arms D D D, the extremities of which I preferably enlarge in the shape of balls or disks $d\,d\,d$. Lever or crank arms $c\,c$ are likewise rigidly attached to the respective ends of said shaft, and are in turn loosely connected by means of links $e\,e$ to the ends $e'\,e'$ of arms, which are pivoted at $e^2\,e^2$, to the opposite ends of which are secured movable plates E E, adapted to cover openings F and G in the respective sides of said box, said plates being of such size and so adjusted with reference to said openings that when the three openings F are closed, as in Figs. 1 and 2, the orifice G is uncovered, and upon the uncovering of one or more of the former openings the latter is closed, as clearly shown by reference to Figs. 2 and 3. The arms D are so adjusted upon the shaft with respect to the slides or plates E that all of said arms are hidden within the box when said slides are over the three openings F, as shown in Figs. 1 and 2, and when one or more of said openings are uncovered one or more of the balls $d$ may be displayed, as in Fig. 3. At right angles to the crank-arms $c\,c$, and attached in like manner to the shaft G, I provide a like crank-arm, $c'$, to which is loosely secured a rod or link, H, which may be extended through the wall of the station-house and there connected with a bell-crank lever, I, Fig. 1, which in turn is connected by a like rod, J, to a handle or operating-lever, K, by which said signal is manipulated. A graduated rack, L, with suitable notches and a spring-catch constructed in the usual manner, enables the operator to determine what signals are displayed, and to lock the same securely in place when so displayed.

It is manifest that the balls $d\,d\,d$, which may be of any suitable color, are intended for day and the openings F G for night signals. In using the latter a lamp, M, Fig. 4, is placed in the box A, while glass of suitable colors is secured over said openings.

Said signals may be operated as follows: During the day, if the track is clear, the lever K may be adjusted as shown in Fig. 1, when the balls $d\,d\,d$ are hidden within said box. If desirable to stop one class of trains—as, for example, passenger-trains—said lever K may be moved one notch, when a single ball $d$ is displayed beneath the box. To stop freight-trains, two balls may be displayed, while the dropping of all the balls may be understood as a signal for all trains to stop. At night, when the track is clear, the opening G is uncovered and a white light displayed therefrom, while the moving of the lever K one or more notches covers the opening G and displays one or more colored lights at F, the night-signals having the same significance as those used during the day. Thus it will be seen that instead of stopping all trains for orders when a signal is displayed, and requiring the conductor to leave the train and procure a written order from the telegraph-operator before proceeding, as has heretofore been customary, only such as it is deemed necessary to detain need stop, thus saving much time and annoyance.

Having thus described my invention, what I claim, and desire to secure by Letters Patent, is—

1. A railway-signal consisting of a closed box provided with a series of openings for the display of lights therein, suitable slides on either side for hiding or displaying said openings at night, a series of balls or disks corresponding in number to said night danger-signals, and means for operating said slides and balls, whereby one or more of said balls or openings may be displayed at will, substantially in the manner and for the purposes specified.

2. A railway-signal consisting of the balls $d\ d\ d$, slides E E, and box A, having suitable openings, said slides and balls being connected with a rock-shaft provided with means for tilting the same from a distance, all combined and arranged substantially in the manner and for the purposes above described.

3. A day and night railway-signal consisting of the box A, having a rock-shaft therein, and means for partially revolving the same from a distance, in combination with the slides E E, openings F G, and balls $d\ d\ d$, all arranged and constructed substantially as described.

CHARLES F. WILLIAMS.

Witnesses:
D. H. FLETCHER,
CLARENCE B. STORY.